United States Patent

Brack et al.

[11] 4,000,130
[45] Dec. 28, 1976

[54] CATIONIC DYESTUFFS
[75] Inventors: Alfred Brack, Odenthal; Roderich Raue, Leverkusen, both of Germany
[73] Assignee: Bayer Aktiengesellschaft, Leverkusen, Germany
[22] Filed: Oct. 15, 1974
[21] Appl. No.: 515,079
[30] Foreign Application Priority Data
Oct. 18, 1973 Germany ............... 2352247
[52] U.S. Cl. .................. 260/240 G; 8/177 R; 8/178 R; 8/179; 260/240.8; 260/250 R; 260/251 R; 260/251 Q; 260/290 V; 260/304 R
[51] Int. Cl.² ............ C07D 209/14; C07D 409/12
[58] Field of Search ...... 260/240.8, 240 G, 362.16, 260/566 B

[56] References Cited
UNITED STATES PATENTS

| | | | |
|---|---|---|---|
| 2,340,882 | 2/1944 | Kendall | 260/240.8 |
| 2,368,305 | 1/1945 | Kendall | 260/240.8 |
| 3,313,798 | 4/1967 | Dehnert et al. | 260/240 G |
| 3,761,471 | 9/1973 | Nishimura et al. | 260/240 G |

*Primary Examiner*—Arthur P. Demers
*Attorney, Agent, or Firm*—Plumley and Tyner

[57] ABSTRACT

Cationic dyestuffs of the formula

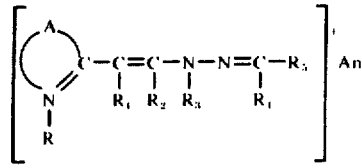

wherein
R represents an alkyl, alkenyl, cycloalkyl, aralkyl, aryl or heteryl radical or an alkylene radical bonded to A or to a ring fused with A,
$R_1$ represents hydrogen, an alkyl, aralkyl, aryl or heteryl or nitrile,
$R_2$ represents hydrogen, alkyl, aralkyl or aryl,
$R_3$ represents alkyl,
$R_4$ represents hydrogen, alkyl, aralkyl, aryl, heteryl or alkylene or arylene bonded to $R_5$,
$R_5$ represents a five- or six-membered aromatic ring,
A represents the remaining members of a heterocyclic 5-membered or 6-membered ring and
An⁻ represents an anion, a process for their preparation and their use for dyeing, printing and bulk dyeing of natural and synthetic materials.

7 Claims, No Drawings

CATIONIC DYESTUFFS

The invention relates to new cationic dyestuffs of the general formula

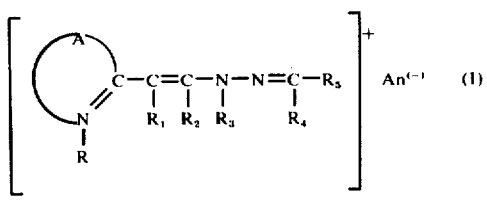

wherein
- R represents an alkyl, alkenyl, cycloalkyl, aralkyl, aryl or heteryl radical or an alkylene radical bonded to A or to a ring fused with A,
- $R_1$ represents hydrogen, an alkyl, aralkyl, aryl or heteryl radical or a nitrile group,
- $R_2$ represents hydrogen, or an alkyl, aralkyl or aryl radical,
- $R_3$ respesents an alkyl radical,
- $R_4$ represents hydrogen, an alkyl, aralkyl, aryl or heteryl radical or an alkylene or arylene radical bonded to $R_5$,
- $R_5$ represents a carbocyclic or heterocyclic five-membered or six-membered ring of aromatic character,
- A represents the remaining members of a heterocyclic 5-membered of 6-membered ring and
- $An^{(-)}$ represents an anion, and wherein the cyclic and acyclic radicals can contain nonionic substituents and/or carboxyl groups and can be fused to the rings of other rings which optionally possess non-ionic substituents and/or carboxyl groups as substituents; and also to a process for the preparation of these dyestuffs and to their use for dyeing, printing and bulk dyeing of natural and synthetic materials.

The following may be mentioned as examples of alkyl radicals R, $R_1$, $R_2$, $R_3$ and $R_4$: above all, $C_1$–$C_6$-alkyl radicals, such as the methyl, ethyl, n- and i-propyl, n-, sec.- and t-butyl radical and the n- and i-amyl and n-hexyl radical; also, $C_1$–$C_6$-alkyl radicals substituted by halogen atoms or hydroxyl, $C_1$–$C_4$-alkoxy, nitrile, $C_1$–$C_4$-alkoxycarbonyl or carbonamide groups, such as the 2-chloroethyl, 2-hydroxyethyl, 2-cyanoethyl, 2-carbonamidoethyl, 2-methoxycarbonylethyl, 2-ethoxycarbonylethyl and 2-hydroxypropyl-(1) radical.

In addition, alkenyl radicals R which should be mentioned are above all $C_3$–$C_6$-alkenyl radicals, such as the allyl, methallyl and 2-chloroallyl radical, and cycloalkyl radicals R which should be mentioned are above all the cyclopentyl and cyclohexyl radical and their derivatives substituted by halogen atoms or $C_1$–$C_6$-alkyl groups, such as the 4-chlorocyclohexyl radical and the dimethylcyclohexyl radical.

Possible aralkyl radicals R, $R_1$, $R_2$ and $R_4$ are above all the benzyl, 2-phenylethyl, β-phenyl-β-hydroxyethyl and 2-phenylpropyl-(2) radical and their derivatives substituted in the phenyl nucleus by non-ionic groups or atoms, such as halogen, $C_1$–$C_6$-alkyl or $C_1$–$C_6$-alkoxy, e.g. aryl radicals R, $R_1$, $R_2$ and $R_4$ which should be mentioned are above all the phenyl and naphthyl radical and their derivatives substituted by non-ionic groups or atoms, auch as halogen, $C_1$–$C_6$-alkyl or $C_1$–$C_6$-alkoxy.

Possible heteryl radicals $R_1$ and $R_4$ are heterocyclic structures of non-aromatic and, above all, of aromatic character, such as the benzoxazolyl, benzthiazolyl and thiazolyl radical.

Aromatic five-membered or six-membered carbocyclic and heterocyclic structures $R_5$ which should be mentioned are above all: the phenyl, naphthyl, benzoxazolyl, benzthiazolyl and thiazolyl radical and especially the thienyl radical and their derivatives substituted by non-ionic groups such as halogen, $C_1$–$C_6$-alkyl, $C_1$–$C_4$-alkoxy or nitro.

Preferred dyestuffs of the formula I are those in which

A represents the remaining members of an indolenine, quinoxaline, quinazoline, pyridine, pyrimidine, benzthiazole or benz-(c,d)-indole ring system. Amongst these dyestuffs, in turn, those are particularly preferred which correspond to the formulae II and III

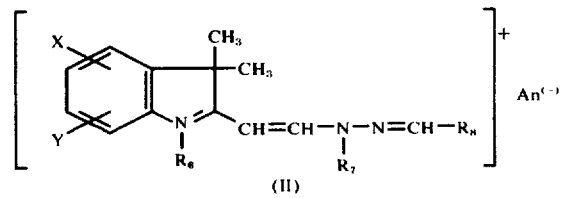

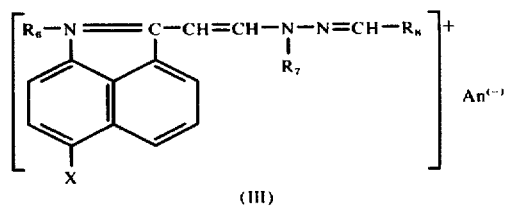

in which
- $R_6$ represents a lower alkyl radical which can be substituted by halogen atoms or hydroxyl, alkoxy, nitrile, alkoxycarbonyl, carboxylic acid amide or carboxyl groups,
- $R_7$ represents a lower alkyl radical which can be substituted by halogen atoms or hydroxyl, alkoxy, nitrile, alkoxycarbonyl, carboxylic acid amide or carboxyl groups,
- $R_8$ represents a phenyl radical which can be substituted by lower alkyl, hydroxyl, lower alkoxy, amino, acylamino, alkylamino, arylamino or carboxyl groups and by halogen atoms, or represents an α-thienyl radical,
- X represents hydrogen, a halogen atom or an alkyl, lower alkoxy, lower alkoxycarbonyl, carboxylic acid amide, nitrile, carboxyl, lower alkylsulphonyl, amino, acylamino, alkylamino, aralkylamino or acyl group, Y represents hydrogen, a halogen atom or an alkyl, lower alkoxy, lower alkoxycarbonyl, nitrile, carboxyl, lower alkylsulphonyl, amino, acylamino, alkylamino, aralkylamino or acyl group and
- $An^{(-)}$ represents an anion.

Amongst the dyestuffs of the formula II, those are particularly preferred which correspond to the formula

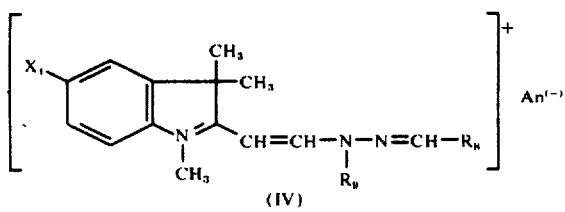

in which

R$_u$ and An$^{(-)}$ have the meaning indicated under formulae (II) and (III) and X$_1$ represents hydrogen, a halogen atom, a lower alkyl or alkoxy group, an acylamino group or a lower alkoxycarbonyl group and R$_9$ represents a lower alkyl, β-hydroxyethyl or β-cyanoethyl group.

By lower alkyl, alkoxy, alkoxycarbonyl and alkylsulphonyl groups there are understood groups which represent, or contain, a C$_1$–C$_4$-alkyl group.

Non-ionic substituents in the sense of the present invention are substituents which are customary in dyestuff chemistry and do not dissociate under the reaction conditions in question, such as halogen, for example fluorine, chlorine or bromine; alkyl; alkenyl especially with 2–6 C-atoms; aralkyl; aryl; alkoxy; cycloalkoxy; aralkoxy; aryloxy, aryloxyalkoxy, alkylthio, aralkythio, arylthio; nitro; nitrile, alkoxycarbonyl, formyl; alkylcarbonyl, arylcarbonyl, arylcarbonyloxy, alkylcarbonyloxy, aralkylcarbonyl, alkoxycarbonyloxy, alkylcarbonylamino, arylcarbonylamino, arylaminocarbonyloxy, alkylaminocarbonyloxy, alkylsulphonylamino; arylsulphonylamino, ureido, N-arylureido, N-alkylureido, aryloxycarbonylamino, alkoxycarbonylamino, carbamoyl, N-alkylcarbamoyl, N,N-dialkylcarbamoyl, N-alkyl-N-aryl-carbamoyl, sulphamoyl, N-alkylsulphamoyl, N,N-dialkyl-sulphamoyl, alkylsulphonyl, alkenylsulphonyl, aralkylsulphonyl, arylsulphonyl, aryloxycarbonyl, alkoxysulphonyl and aryloxysulphonyl; alkyl radicals mentioned contain preferably 1–4 C-atoms; aryl radicals are preferably phenyl or naphthyl, and cycloalkyl radicals mentioned are preferably cyclopentyl or cyclohexyl.

Possible anionic radicals An$^{(-)}$ are the organic and inorganic anions which are customary for cationic dyestuffs.

Examples of inorganic anions are fluoride, chloride, bromide and iodide, perchlorate, hydroxyl, radicals of acids containing S, such as bisulphate, sulphate, disulphate and aminosulphate; radicals of nitrogen-oxygen acids, such as nitrate; radicals of oxygen acids of phosphorus, such as dihydrogen phosphate, hydrogen phosphate, phosphate and metaphosphate; radicals of carbonic acid, such as bicarbonate and carbonate; further anions of oxygen acids and complex acids, such as methosulphate, ethosulphate, hexafluosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate and tetrafluoborate, as well as anions of esters of boric acid, such as of the glycerol ester of boric acid, and of esters of phosphoric acid, such as of methylphosphate.

Examples of organic anions are anions of saturated or unsaturated aliphatic, cycloaliphatic, aromatic and heterocyclic carboxylic acids and sulphonic acids, such as radicals of acetic acid, chloroacetic acid, cyanoacetic acid, hydroxyacetic acid, aminoacetic acid, methylaminoacetic acid, aminoethylsulphonic acid, methylaminoethylsulphonic acid, propionic acid, n-butyric acid, i-butyric acid, 2-methyl-butyric acid, 2-ethyl-butyric acid, dichloroacetic acid, trichloroacetic acid, trifluoroacetic acid, 2-chloropropionic acid, 3-chloropropionic acid, 2-chlorobutyric acid, 2-hydropropionic acid, 3-hydroxypropionic acid, O-ethylglycolic acid, thioglycollic acid, glyceric acid, malic acid, dodecyl-tetraethylene glycolether-propionic acid, 3-(nonyloxy)-propionic acid, 3-(isotridecyloxy)-propionic acid, 3-(isotridecyloxy)-diethylene glycolether-propionic acid, the ether-propionic acid of the alcohol mixture with 6 to 10 carbon atoms, thioacetic acid, 6-benzoylamino-2-chlorocaproic acid, nonylphenol-tetraethylene glycolether-propionic acid, nonylphenol-diethylene glycol-ether-propionic acid, dodedcyl-tetraethylene glycol-ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 from SHELL), a mixture of aliphatic carboxylic acids with 15 to 19 carbon atoms (Versatic Acid 1519 from SHELL), coconut fatty acid first runnings, undecanecarboxylic acid, n-tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid, the isomer mixture of 2,2,4- and 2,4,4,-trimethyladipic acid, sebacic acid, isosebacic acid (isomer mixture), tartaric acid, citric acid, glyoxylic acid, dimethyl etherα,α'-dicarboxylic acid, methylene-bis-thioglycollic acid, dimethyl sulphide-α,α-dicarboxylic acid, 2,2'-dithio-di-n-propionic acid, fumaric acid, maleic acid, itaconic acid, ethylene-bis-iminoacetic acid, nitrilosulphonic acid, methanesulphonic acid, ethanesulphonic acid, chloromethanesulphonic acid, 2-chloroethanesulphonic acid and 2hydroxyethanesulphonic acid and Mersolat, that is to say C$_8$–C$_{18}$ paraffinsulphonic acids, obtained by hydrolysis of the sulphochlorination products of the corresponding n-paraffins.

Examples of suitable anions of cycloaliphatic carboxylic acids are the anions of cyclohexanecarboxylic acid and cyclohexene-3-carboxylic acid and examples of anions of araliphatic monocarboxylic acids are anions of phenylacetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4-tert.-butylbenzoic acid, 2-bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitrobenzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercaptobenzoic acid, 4-nitro-3-methylbenzoic acid, 4-aminobenzoic acid, 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4- hydroxybenzoic acid, 5-chloro-2-hydroxy-3-methylbenzoic acid, 7ethylmercapto-2-chlorobenzoic acid, 2-hydroxy-3-methylbenzoic acid, 6-hydroxy3-methylbenzoic acid, 2-hydroxy-4-methylbenzoic acid, 6-hydroxy-2,4-dimethylbenzoic acid, 6-hydroxy-3-tert.-butylbenzoic acid, phthalic acid, tetrachlorophthalic acid, 4-hydroxyphthalic acid, 4-methoxyphthalic acid, isophthalic acid, 4-chloroisophthalic acid, 5-nitroisophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid mono-n-butyl ester, terephthalic acid monomethyl ester, 3-hydroxy-5,6,7,8-tetrahydronaphthalene-2-carboxylic acid, 2-hydroxy-1-naphthoic acid and anthraquinone-2-carboxylic acid.

Examples of suitable anions of heterocyclic carboxylic acids are the anions of pyromucic acid, dehydromucic acid and indolyl-3-acetic acid.

Examples of suitable anions of aromatic sulphonic acids are the anions of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-ω-sulphonic acid, 2-chlorotoluene-4-sulphonic acid, 2-hydroxybenzenesulphonic acid, n-dodecylbenzenesulphonic acid, 1,2,3,4-tetrahydronaphthalenesulphonic acid, naphthalene-1-sulphonic acid, naphthalene-1,4- or -1,5-disulphonic acid, naphthalene-1,3,5- trisulphonic acid, 1-naphthol-2-sulphonic acid, 5-nitronaphthalene-2-sulphonic acid, 8-aminonaphthalene-1-sulphonic acid, stilbene-2,2'-disulphonic acid and biphenyl-2-sulphonic acid.

An example of a suitable anion of a heterocyclic sulphonic acid is the anion of quinoline-5-sulphonic acid.

Further anions which can be used are those of arylsulphinic, arylphosphonic and arylphosphonous acids, such as benzenesulphinic acid and benzenephosphonic acid.

Colourless anions which do not excessively impair the solubility in water of the cationic compounds are preferred. The anion is in general decided by the preparation process and by the purification of the cationic compounds which may be carried out. In general, the cationic compounds are in the form of halides (especially chlorides or bromides) or methosulphates, ethosulphates, sulphates, benzenesulphonates or toluenesulphonates, or acetates. These anions can be replaced by other anions in a known manner.

The dyestuffs of the formula 1 can be prepared by condensation of a carbonyl compound of the general formula

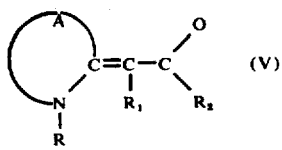

in which

R, R₁, R₂ and A have the meaning indicated under the formula 1 and the cyclic and the acyclic radicals can contain non-ionic substituents and/or carboxyl groups or suitable functional derivatives of these carbonyl compounds, for example the primary products of the Vilsmeier aldehyde synthesis, with a hydrazone of the general formula

in which

R₃, R₄ and R₅ have the meaning indicated under the formula (1).

This condensation in general already takes place on bringing together the components V and VI in an acid medium, such as dilute or anhydrous acetic acid, dilute or concentrated hydrochloric acid, sulphuric acid, phosphoric acid or methanesulphonic acid.

To accelerate the reaction, the mixture can be warmed, but in doing so temperatures of about 120° C should in general not be exceeded.

The condensation can also be carried out in solvents which are inert under the reaction conditions, such as halogenohydrocarbons, for example chloroform, carbon tetrachloride, trichloroethane, perchloroethylene, chlorobenzene or trichlorobenzene, or hydrocarbons, such as toluene or xylene, using an agent which splits off water and provides an anion An⁻, such as phosphorus oxychloride, phosgene, thionyl chloride or phosphorus pentoxide.

It is also possible to employ the condensation agents, preferably phosphorus oxychloride, in such excess that they serve at the same time as solvents.

Examples of suitable starting compounds of the formula V are the indolin-ω-aldehydes listed in Table 1, the benz(c,d)-indol-ω-aldehydes mentioned in Table 2, the quinoxalon-ω-aldehydes listed in Table 3, the quinazolon-ω-aldehydes mentioned in Table 4, 3-methyl-(and 3-ethyl)-3methylenedihydro-(2,3)-benzthiazol-ω-aldehyde, 3-ethyl-2-formylmethylene-4,5-benzodihydro-(2,3)-benzthiazole, 3,4-dimethyl-2-formylmethylenedihydro-(2,3)-thiazole, 3-methyl-2-formylmethylenedihydro-(1,2)-benzoxazole, 1,6-dimethyl-2-formylmethylenedihydro-(1,2)-quinoline and 1-methyl-4-formylmethylenedihydro-(1,4)-quinoline.

Suitable functional derivatives of the carbonyl compounds of the formula V are, for example, acetals, nitrones, azomethines and enamines and their salts, such as anilinovinyl compounds and the primary products of the Vilsmeier aldehyde synthesis, as well as the corresponding geminal dihalogen compounds.

Table 1

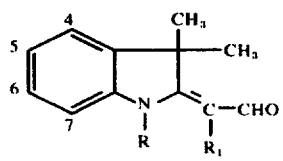

| $R_1$ | R | 4 | 5 | 6 | 7 |
|---|---|---|---|---|---|
| Hydrogen | Methyl | Hydrogen | Hydrogen | Hydrogen | Hydrogen |
| Nitrile | Methyl | Hydrogen | Hydrogen | Hydrogen | Hydrogen |
| Nitrile | Methyl | Hydrogen | Methoxy | Hydrogen | Hydrogen |
| Nitrile | Methyl | Hydrogen | Ethoxy | Hydrogen | Hydrogen |
| Hydrogen | Ethyl | Hydrogen | Hydrogen | Hydrogen | Hydrogen |
| Hydrogen | Phenyl | Hydrogen | Hydrogen | Hydrogen | Hydrogen |
| Hydrogen | Benzyl | Hydrogen | Hydrogen | Hydrogen | Hydrogen |
| Hydrogen | Methyl | Methyl | Hydrogen | Hydrogen | Hydrogen |
| Hydrogen | Methyl | Hydrogen | Methyl | Hydrogen | Hydrogen |
| Hydrogen | Methyl | Hydrogen | Hydrogen | Methyl | Hydrogen |
| Hydrogen | Methyl | Hydrogen | Hydrogen | Hydrogen | Methyl |
| Hydrogen | Methyl | Hydrogen | Hydrogen | Hydrogen | Ethyl |
| Hydrogen | Methyl | Hydrogen | Methoxy | Hydrogen | Hydrogen |
| Hydrogen | Methyl | Hydrogen | Ethoxy | Hydrogen | Hydrogen |
| Hydrogen | Methyl | Hydrogen | Trifluoromethyl | Hydrogen | Hydrogen |
| Hydrogen | Methyl | Hydrogen | Fluorine | Hydrogen | Hydrogen |
| Hydrogen | Methyl | Hydrogen | Chlorine | Hydrogen | Hydrogen |
| Hydrogen | Methyl | Hydrogen | Chlorine | Hydrogen | Chlorine |
| Hydrogen | Methyl | Hydrogen | Chlorine | Hydrogen | Methoxy |
| Hydrogen | Methyl | Hydrogen | Methylsulphonylamino | Hydrogen | Methoxy |
| Hydrogen | Methyl | Hydrogen | Dimethylamino | Hydrogen | Methoxy |
| Hydrogen | Methyl | Methoxycarbonyl | Hydrogen | Hydrogen | Methoxy |
| Hydrogen | Methyl | Hydrogen | Nitrile | Hydrogen | Methoxy |
| Hydrogen | Methyl | Hydrogen | Methoxycarbonyl | Hydrogen | Methoxy |
| Hydrogen | Methyl | Hydrogen | Acetyl | Hydrogen | Methoxy |
| Hydrogen | Methyl | Hydrogen | Phenyl | Hydrogen | Methoxy |
| Hydrogen | Methyl | Hydrogen | Hydrogen | Hydrogen | Phenyl |
| Hydrogen | Methyl | Hydrogen | Cyclohexyl | Hydrogen | Hydrogen |
| Hydrogen | Methyl | Hydrogen | Hydrogen | Methoxycarbonyl | Hydrogen |
| Hydrogen | Methyl | Chlorine | Hydrogen | Chlorine | Hydrogen |
| Hydrogen | Methyl | Methoxy | Hydrogen | Methoxy | Hydrogen |
| Hydrogen | Ethyl | 4,5-benzo | | Hydrogen | Hydrogen |
| Hydrogen | Methyl | Hydrogen | 5,6-benzo | | Ethyl |
| Hydrogen | Methyl | Hydrogen | Hydrogen | 6,7-benzo | |

Table 2

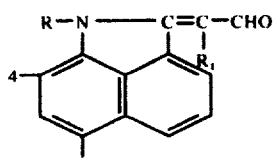

| $R_1$ | R | x | y |
|---|---|---|---|
| Hydrogen | Methyl | Hydrogen | Hydrogen |
| Hydrogen | Ethyl | Hydrogen | Hydrogen |
| Hydrogen | n-Propyl | Hydrogen | Hydrogen |
| Hydrogen | iso-Propyl | Hydrogen | Hydrogen |
| Hydrogen | n-Butyl | Hydrogen | Hydrogen |
| Hydrogen | iso-Butyl | Hydrogen | Hydrogen |
| Hydrogen | n-Amyl | Hydrogen | Hydrogen |
| Hydrogen | Cyclohexyl | Hydrogen | Hydrogen |
| Hydrogen | Benzyl | Hydrogen | Hydrogen |
| Hydrogen | β-Phenylethyl | Hydrogen | Hydrogen |
| Hydrogen | Phenyl | Hydrogen | Hydrogen |
| Nitrile | Ethyl | Hydrogen | Hydrogen |
| Nitrile | Ethyl | Methoxy | Hydrogen |
| Hydrogen | Ethyl | Methoxy | Hydrogen |
| Hydrogen | Ethyl | Chlorine | Hydrogen |
| Hydrogen | Ethyl | Chlorine | Chlorine |
| Hydrogen | Ethyl | Bromine | Hydrogen |
| Hydrogen | Ethyl | Bromine | Bromine |
| Hydrogen | Methyl | Hydrogen | Ethyl |
| Hydrogen | Ethyl | Dimethylamino | Hydrogen |

Table 3

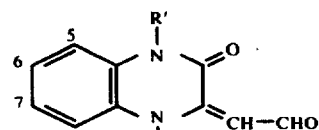

| R | R' | 5 | 6 | 7 | 8 |
|---|---|---|---|---|---|
| Methyl | Methyl | Hydrogen | Hydrogen | Hydrogen | Hydrogen |
| Methyl | Ethyl | Hydrogen | Hydrogen | Hydrogen | Hydrogen |
| Methyl | n-Propyl | Hydrogen | Hydrogen | Hydrogen | Hydrogen |
| Methyl | iso-Propyl | Hydrogen | Hydrogen | Hydrogen | Hydrogen |
| Methyl | n-Butyl | Hydrogen | Hydrogen | Hydrogen | Hydrogen |
| Methyl | iso-Butyl | Hydrogen | Hydrogen | Hydrogen | Hydrogen |
| Methyl | n-Hexyl | Hydrogen | Hydrogen | Hydrogen | Hydrogen |
| Methyl | Benzyl | Hydrogen | Hydrogen | Hydrogen | Hydrogen |
| Methyl | β-Phenylethyl | Hydrogen | Hydrogen | Hydrogen | Hydrogen |
| Methyl | Cyclohexyl | Hydrogen | Hydrogen | Hydrogen | Hydrogen |
| Methyl | Phenyl | Hydrogen | Hydrogen | Hydrogen | Hydrogen |
| Ethyl | Methyl | Hydrogen | Hydrogen | Hydrogen | Hydrogen |
| Ethyl | Phenyl | Hydrogen | Hydrogen | Hydrogen | Hydrogen |
| Methyl | Methyl | Methyl | Hydrogen | Hydrogen | Hydrogen |
| Methyl | Methyl | Hydrogen | Methyl | Hydrogen | Hydrogen |
| Methyl | Methyl | Hydrogen | Hydrogen | Methyl | Hydrogen |
| Methyl | Methyl | Hydrogen | Hydrogen | Hydrogen | Methyl |
| Methyl | Methyl | Hydrogen | Methoxy | Hydrogen | Hydrogen |
| Methyl | Methyl | Hydrogen | Ethoxy | Hydrogen | Hydrogen |
| Methyl | Methyl | Hydrogen | Chlorine | Hydrogen | Hydrogen |

Table 4

| R | R' | 5 | 7 |
|---|---|---|---|
| Methyl | Hydrogen | Hydrogen | Hydrogen |
| Ethyl | Hydrogen | Hydrogen | Hydrogen |
| Phenyl | Hydrogen | Hydrogen | Hydrogen |
| Methyl | Methyl | Hydrogen | Hydrogen |
| n-Butyl | Methyl | Hydrogen | Hydrogen |
| Cyclohexyl | Methyl | Hydrogen | Hydrogen |
| Benzyl | Methyl | Hydrogen | Hydrogen |
| β-Phenylethyl | Methyl | Hydrogen | Hydrogen |
| Methoxycarbonylmethyl | Hydrogen | Hydrogen | Hydrogen |
| p-Chlorophenyl | Methyl | Hydrogen | Hydrogen |
| Methyl | Methyl | Methyl | Hydrogen |
| Methyl | Methyl | Hydrogen | Methyl |
| Methyl | Methyl | Methyl | Methyl |
| Methyl | Methyl | Methoxy | Hydrogen |
| Methyl | Methyl | Methoxy | Methoxy |
| Methyl | Hydrogen | Hydrogen | iso-Propyl |
| Methyl | Methyl | Chlorine | Hydrogen |
| Methyl | Methyl | Bromine | Hydrogen |
| Methyl | Methyl | Acetyl | Hydrogen |
| Methyl | Hydrogen | Dimethylamino | Hydrogen |

Examples of suitable starting compounds of the formula VI are benzaldehyde-, salicylaldehyde-, 2-, 3- and 4-methoxybenzaldehyde-, 3,4-dimethoxy-benzaldehyde-, 3,4-diethoxybenzaldehyde-, 3,4-di-isopropoxy-benzaldehyde-, 3,4,5-trimethoxy-benzaldehyde-, 4-phenoxy-benzaldehyde-, 2-, 3- and 4-methyl-benzaldehyde, 4-cyclohexyl-benzaldehyde, 4-tertiarybutyl-benzaldehyde-, 2-, 3- and 4-chloro-benzaldehyde-, 2,4-dichloro-benzaldehyde-, 3,4-dichloro-benzaldehyde, 4-bromobenzaldehyde-, 4amino-benzaldehyde-, 4-acetamino-benzaldehyde-, 4-dimethylamino-benzaldehyde-, 4-phenyl-methylamino-benzaldehyde-, 2- and 4-carboxy-benzaldehyde-, acetophenone-, 4-methoxy- and 4-amino-acetophenone-, propionphenone-, indanone-(2)-, fluorenone-, benzophenone-, thiophen-2-aldehyde-, acetothienone-(2)-, benzthiazol-2-aldehyde-, benzoxazol-2-aldehyde-, benzimidazol-2-aldehyde-, pyrimidon-2-aldehyde-, furfuraldehyde-, N-ethylpyrrol-2-aldehyde, pyridin-4-aldehyde-, pyrazol-4-aldehyde- and 1,3-dimethyl-pyrazol-4-aldehyde-N-methyl-hydrazone, and also the corresponding hydrazones which instead of the N-methyl group have a N-ethyl, N-n-propyl, N-i-propyl, N-butyl, N-β-hydroxyethyl, N-β-chloroethyl, N-β-cyanoethyl or N-β-hydroxycarbonylethyl group.

The new dyestuffs are suitable for dyeing, printing and bulk dyeing of materials which consist entirely or predominantly of polymerised unsaturated nitriles, such as acrylonitrile and vinylidene cyanide, or of acid-modified polyesters or of acid-modified polyamides. They are furthermore suitable for the other known applications of cationic dyestuffs, such as dyeing and printing of cellulose acetate, coir, jute, sisal and silk, tannin-treated cotton and paper, for the preparation of ball-pen pastes and rubber-stamp inks, and for use in flexographic printing. The dyeings and prints on the first-mentioned materials, especially on polyacrylonitrile, are distinguished by their very high level of fastness, above all by very good fastness to light, wet processing, rubbing, decatising, sublimation and perspiration.

The dyestuffs are furthermore distinguished by their exceptionally even affinity, which permits the production of completely level dyeings in a simple manner.

In addition, the dyestuffs of the formula II are distinguished by particularly good solubility and by exceptional purity of colour shade.

The parts mentioned in the examples are parts by weight, unless stated otherwise.

EXAMPLE 1

10.1 parts of 1,3,3-trimethyl-2-methyleneindolin-ω-aldehyde and 6.7 parts of benzaldehyde-N-methyl-hydrazone are introduced into 100 parts of 20% strength sulphuric acid at room temperature. The dyestuff immediately begins to separate out in yellow crystals. The suspension is stirred for a further 3 hours at room temperature and the dyestuff is filtered off, washed with 600 parts of 20% strength sodium chloride solution and dried.

The dyestuff thus obtained, of the formula

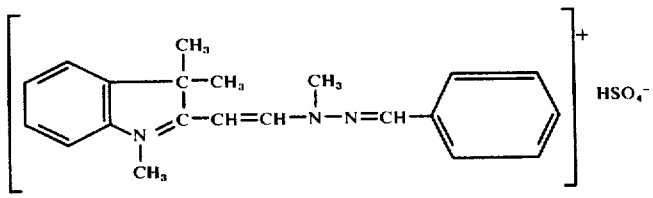

dyes polyacrylonitrile fabric in a brilliant greenish-tinged yellow. The dyeing is distinguished by very good fastness to light and to washing.

The benzaldehydemethylhydrazone used was prepared as follows:

A solution of 53 parts of benzaldehyde and 23 parts of methylhydrazine in 50 parts by volume of alcohol was heated to the boil under reflux for 3 hours.

The reaction mixture was then distilled. Yield: 59.3 parts of benzaldehydemethylhydrazone, boiling point: 133°–134° C/18 mm Hg.

If instead of the benzaldehydemethylhydrazone, 8.7 g of 4methoxybenzaldehydemethylhydrazone, prepared in the same manner, were employed when preparing the dyestuff, an equivalent dyestuff was obtained, which also dyes polyacrylonitrile materials in a light-fast brilliant greenish-tinged yellow.

If, in the process of preparation described above, 1,3,3-trimethyl-2-methyleneindolin-ω-aldehyde and benzaldehyde-N-methyl-hydrazone were replaced by equivalent amounts of the aldehydes and hydrazones indicated in the table which follows, equivalent dyestuffs were obtained, which dyes polyacrylonitrile in brilliant colour shades indicated in the right-hand column of the table:

| Aldehyde | Hydrazone | Colour shade on polyacrylonitrile |
|---|---|---|
| 1,3,3-Trimethyl-2-methyleneindolin-ω-aldehyde | Benzaldehyde-ethylhydrazone | greenish-tinged yellow |
| " | 4-Methoxybenzaldehyde-ethylhydrazone | " |
| " | 4-Methylbenzaldehyde-methylhydrazone | " |
| 5-Methyl-1,3,3-trimethyl-2-methyleneindolin-ω-aldehyde | Benzaldehyde-methylhydrazone | " |
| " | Benzaldehyde-ethylhydrazone | " |
| 5-Chloro-1,3,3-trimethyl-2-methyleneindolin-ω-aldehyde | Benzaldehyde-methylhydrazone | " |
| 5-Methoxy-1,3,3-trimethyl-2-methyleneindolin-ω-aldehyde | " | " |
| 5-Ethoxy-1,3,3-trimethyl-2-methyleneindolin-ω-aldehyde | " | " |
| 5-Carbomethoxy-1,3,3-trimethyl-2-methyleneindolin-ω-aldehyde | " | " |
| 7-Methyl-1,3,3-trimethyl-2-methyleneindolin-ω-aldehyde | " | " |
| 7-Chloro-1,3,3-trimethyl-2-methyleneindolin-ω-aldehyde | " | " |
| 5-Methoxy-7-chloro-1,3,3-trimethyl-2-methyleneindolin-ω-aldehyde | " | " |
| 5-Phenoxy-1,3,3-trimethyl-2-methyleneindolin-ω-aldehyde | " | " |
| 5-Benzyloxy-1,3,3-trimethyl-2-methyleneindolin-ω-aldehyde | " | " |
| 5-Methylsulphonyl-1,3,3-trimethyl-2-methyleneindolin-ω-aldehyde | Benzaldehyde-methylhydrazone | greenish-tinged yellow |
| 5-Ethoxy-1-ethyl-3,3-dimethyl-2-methyleneindolin-ω-aldehyde | " | " |
| 5-Benzoxazolyl-1,3,3-trimethyl-2-methyleneindolin-ω-aldehyde | " | " |
| 1,3,3-Trimethyl-2-methyleneindolin-ω-aldehyde | 4-Dimethylaminobenzaldehyde-methylhydrazone | golden yellow |
| 5-Methyl-1,3,3,-trimethyl-2-methyleneindolin-ω-aldehyde | " | " |
| 5-Chloro-1,3,3-trimethyl-2-methyleneindolin-ω-aldehyde | " | " |
| 5-Phenoxy-1,3,3-trimethyl-2-methyleneindolin-ω-aldehyde | " | " |
| 1,3,3-Trimethyl-2-methyleneindolin-ω-aldehyde | 2,4-Bis-carboethoxyaminobenzaldehyde-methylhydrazone | greenish-tinged yellow |
| 5-Methyl-1,3,3-trimethyl-2-methyleneindolin-ω-aldehyde | " | " |
| 7-Methyl-1,3,3-trimethyl-2-methyleneindolin-ω-aldehyde | " | " |
| 5-Chloro-1,3,3-trimethyl-2-methyleneindolin-ω-aldehyde | " | " |
| 5-Methoxy-1,3,3-trimethyl-2-methyleneindolin-ω-aldehyde | " | " |
| 5-Carbomethoxy-1,3,3-trimethyl-2-methyleneindolin-ω-aldehyde | " | " |
| 5-Methoxy-7-chloro-1,3,3-trimethyl-2-methyleneindolin-ω-aldehyde | " | " |
| 1,3,3-Trimethyl-2-methyleneindolin-ω-aldehyde | 2-Hydroxybenzaldehyde-methylhydrazone | greenish-tinged yellow |

EXAMPLE 2

10.1 parts of 1,3,3-trimethyl-2-methyleneindolin-β-aldehyde and 7.4 parts of acetophenone-N-methylhydrazone are introduced into 100 parts of 20% strength sulphuric acid at room temperature. The reaction mixture is stirred for 3 hours at room temperature and is filtered, and the dyestuff is then precipitated by adding 25 parts of 50% strength zinc chloride solution. The dyestuff, which is obtained as an oil, is separated off and is recrystallised from one liter of water, with addition of active charcoal. On addition of 50 parts of 50% strength zinc chloride solution, the dyestuff precipitates and is separated off and dried.

The dyestuff thus obtained, of the formula

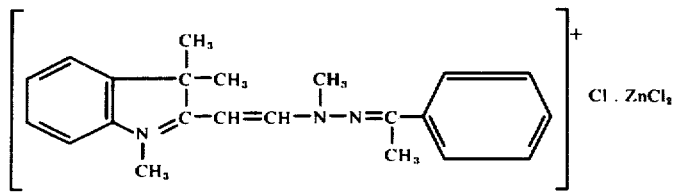

dyes polyacrylonitrile in a brilliant orange. The dyeing is distinguished by good fastness properties.

If instead of 1,3,3-trimethyl-2-methyleneindolin-β-aldehyde, equivalent amounts of 5-methyl-1,3,3-trimethyl-2-methyleneindolin-ω-aldehyde, 5-chloro-1,3,3-trimethyl-2-methyleneindolin-ω-aldehyde or 5-carbomethoxy-1,3,3-trimethyl-2-methyleneindolin-ω-aldehyde were employed, equivalent dyestuffs were obtained, which also give orange dyeings, with good fastness properties, on polyacrylonitrile.

EXAMPLE 3

22.3 parts of the aldehyde of the formula

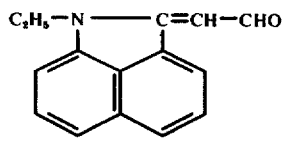

(prepared according to Example 1 of Belgian Pat. No. 647,036) and 13.4 parts of benzaldehyde-N-methylhydrazone are warmed with 100 parts of glacial acetic acid to about 40° C for half an hour. The mixture is then diluted with 500 to 1,000 parts of water. A deep red solution is obtained. The dyestuff of the formula

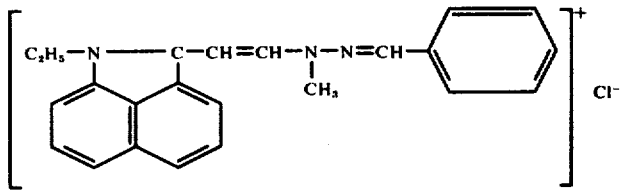

is caused to separate out from this solution by adding sodium chloride.

The yield is about 95% of theory.

The dyestuff dyes polyacrylonitrile in a deep bluish-tinged red.

If instead of benzaldehyde-N-methylhydrazone the equivalent amount of benzaldehyde-N-ethyl-hydrazone, -N-β-cyanoethyl-hydrazone or -N-β-hydroxyethyl-hydrazone was employed, equivalent bluish-tinged red dyestuffs were obtained.

EXAMPLE 4

A polyacrylonitrile fabric is printed with a printing paste which was prepared as follows:

30 parts of the dyestuff described in Example 1, 50 parts of thiodiethylene glycol, 30 parts of cyclohexanol and 30 parts of 30% strength acetic acid are covered with 330 parts of hot water and the resulting solution is added to 500 parts of crystal gum (gum arabic as thickener). Finally, 30 parts of zinc nitrate solution are also added. The resulting print is dried, steamed for 30 minutes and then rinsed. A brilliant greenish-tinged yellow print with very good fastness properties is obtained.

EXAMPLE 5

Acid-modified polyethylene glycol terephthalate fibres are introduced, using a liquor ratio of 1:40, into an aqueous bath at 20° C, which contains, per liter, 3 to 10 g of sodium sulphate, 0.1 to 1 g of oleyl polyglycol ether (50 mols of ethylene oxide per mol of oleyl alcohol), 0 to 15 g of dimethylbenzyldodecylammonium chloride and 0.15 g of the dyestuff described in Example 1, and which was adjusted to pH 4 to 5 with acetic acid. The bath is heated to 100° C over the course of 30 minutes and is kept at this temperature for 60 minutes. The fibres are then rinsed and dried. A brilliant greenish-tinged yellow dyeing with very good fastness properties is obtained.

EXAMPLE 6

Polyacrylonitrile fibres are introduced, using a liquor ratio of 1:40, into an aqueous bath at 40° C, which contains, per liter, 0.75 g of 30% strength acetic acid, 0.38 g of sodium acetate and 0.15 g of the dyestuff described in Example 1. The bath is heated to the boil over the course of 20 to 30 minutes and is kept at this temperature for 30 to 60 minutes. After rinsing and drying, a brilliant greenish-tinged yellow dyeing with very good fastness properties is obtained.

EXAMPLE 7

A stock solution is prepared from 15 parts by weight of the dyestuff mentioned in Example 1, 15 parts by weight of polyacrylonitrile and 70 parts by weight of dimethylformamide and is added to a customary polyacrylonitrile spinning solution, which is spun in a known manner. A greenish-tinged yellow dyeing with very good fastness properties is obtained.

EXAMPLE 8

Acid-modified synthetic polyamide fibres are introduced, using a liquor ratio of 1:40, into an aqueous bath at 40° C, which contains, per liter, 10 g of sodium acetate, 1 to 5 g of oleyl polyglycol ether (50 mols of ethylene oxide per mol of oleyl alcohol) and 0.3 g of the dyestuff described in Example 1 and which has been adjusted to pH 4 to 5 with acetic acid. The bath is heated to 98° C over the course of 30 minutes and is kept at this temperature. The fibres are then rinsed and dried. A brilliant greenish-tinged yellow dyeing is obtained.

We claim:

1. Dyestuff of the formula

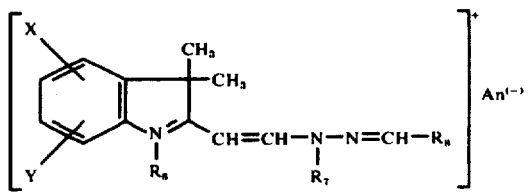

in which $R_6$ and $R_7$ are $C_1$–$C_4$-alkyl; or $C_1$–$C_4$-alkyl substituted by halogen, hydroxyl, $C_1$–$C_4$-alkoxy, cyano, ($C_1$–$C_4$-alkoxy)carbonyl, carbonamido or carboxyl;

$R_8$ is phenyl; phenyl substituted by $C_1$–$C_4$-alkyl, hydroxyl, $C_1$–$C_4$-alkoxy, amino, acetamino, dimethylamino, phenylmethylamino, carboxyl, or halogen; or α-thienyl;

X is hydrogen; halogen; $C_1$–$C_4$-alkyl; $C_1$–$C_4$-alkoxy; ($C_1$–$C_4$-alkoxy):carbonyl; carbonamido; cyano; carboxyl; $C_1$–$C_4$-alkylsulphonyl; amino, methylsulphonylamino; dimethyamino; or acetyl;

Y is hydrogen; halogen; $C_1$–$C_4$-alkyl; $C_1$–$C_4$-alkoxy; ($C_1$–$C_4$-alkoxy)-carbonyl; cyano; carboxyl; $C_1$–$C_4$-alkylsulphonyl; amino, methylsulphonylamino, dimethylamino; or acetyl; and $An^-$ is an anion.

2. Dyestuff of the formula

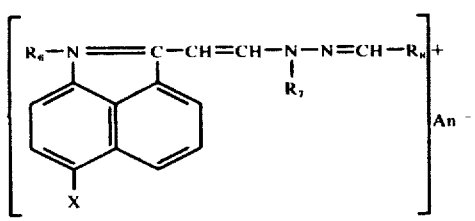

in which

R₆ and R₇ are C₁–C₄-alkyl; or C₁–C₄-alkyl substituted by halogen, hydroxyl, C₁–C₄-alkoxy, cyano, (C₁–C₄alkoxy)carbonyl, carbonamido or carboxyl;

R₈ is phenyl; phenyl substituted by C₁–C₄-alkyl, hydroxyl, C₁–C₄-alkoxy, amino, acetamino, dimethylamino, phenylmethylamino, carboxyl or halogen; or α-thienyl;

X is hydrogen; halogen; C₁–C₄-alkyl; C₁–C₄-alkoxy; (C₁–C₄-alkoxy)-carbonyl; carbonamido; cyano; carboxyl; C₁–C₄-alkylsulphonyl; amino; or dimethylamino; and An⁻ is an anion.

3. Dyestuff according to claim 1 of the formula

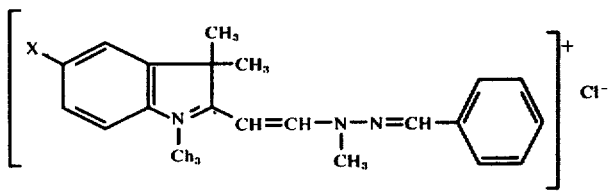

in which X represents hydrogen, chloro, methoxy or methoxycarbonyl.

4. Dyestuff according to claim 1 of the formula

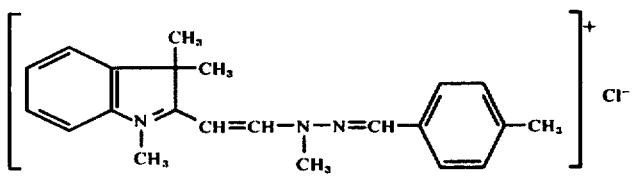

5. Dyestuff according to claim 1 of the formula

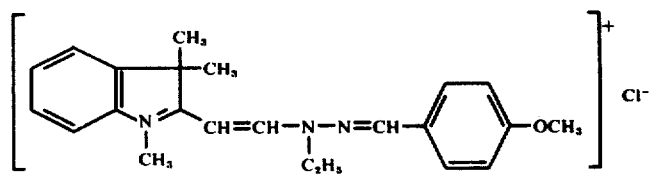

6. Dyestuff of the formula

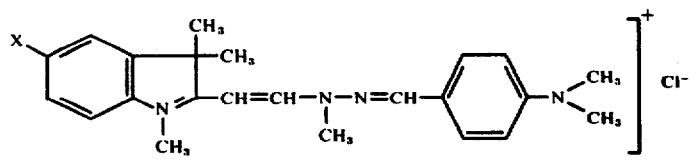

in which X represents hydrogen, methyl, chloro or phenoxy.

7. Dyestuff of claim 1 of the formula

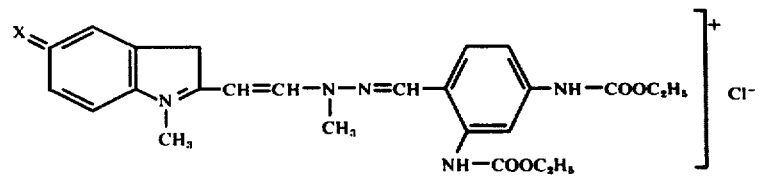

in which X represents hydrogen, methyl, chloro, methoxy or carbomethoxy.

* * * * *